(12) United States Patent
Barnum

(10) Patent No.: US 8,364,085 B2
(45) Date of Patent: *Jan. 29, 2013

(54) DEVICE DISCOVERY AND CHANNEL SELECTION IN A WIRELESS NETWORKING ENVIRONMENT

(75) Inventor: Walter Barnum, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 215 days.

This patent is subject to a terminal disclaimer.

(21) Appl. No.: 12/714,353

(22) Filed: Feb. 26, 2010

(65) Prior Publication Data

US 2010/0214953 A1    Aug. 26, 2010

Related U.S. Application Data

(63) Continuation of application No. 11/051,516, filed on Feb. 3, 2005, now Pat. No. 7,701,900.

(51) Int. Cl.
*H04W 4/00* (2009.01)
*H04L 12/52* (2006.01)

(52) U.S. Cl. ......... 455/62; 455/41.2; 455/446; 370/329; 370/386; 370/338

(58) Field of Classification Search ........................ None
See application file for complete search history.

(56) References Cited

U.S. PATENT DOCUMENTS

| | | | |
|---|---|---|---|
| 7,701,900 B2 * | 4/2010 | Barnum | 455/62 X |
| 2004/0196784 A1 * | 10/2004 | Larsson et al. | 370/228 |
| 2006/0029007 A1 * | 2/2006 | Ayyagari | 370/310 |

* cited by examiner

*Primary Examiner* — Philip Sobutka
(74) *Attorney, Agent, or Firm* — Austin Rapp & Hardman

(57) ABSTRACT

A method and apparatus for device discovery and channel selection in a wireless networking environment are described. As part of an automatic network configuration process, a super node sequentially traverses the available channels, broadcasting discovery messages including the channel switching schedule. Wireless nodes that receive those broadcast messages switch channels in lock step with the super node, sending discovery replies on those channels over which the broadcast discovery messages are successfully received. An association is generated identifying accessible nodes and the channels through which those nodes may be accessed. An optimum channel may then be selected based on this association information. Sub-nodes may repeat the broadcast discovery messages, and relay any discovery replies to the super node. The super node may then identify sub-nodes that may be used as proxies to access nodes that would otherwise be inaccessible.

7 Claims, 5 Drawing Sheets

DEVICE DISCOVERY AND CHANNEL SELECTION IN A WIRELESS NETWORKING ENVIRONMENT

CROSS-REFERENCE TO RELATED PATENT APPLICATION

This patent application is a continuation of U.S. patent application Ser. No. 11/051,516 now U.S. Pat. No. 7,701,900 entitled "Device Discovery and Channel Selection in a Wireless Networking Environment" filed Feb. 3, 2005.

FIELD OF THE INVENTION

The invention relates to the field of wireless networking, and more specifically to device discovery and channel selection in a wireless network.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyrights associated with this document.

BACKGROUND

Wireless technology allows networked devices to move freely within a network area without being tethered to a wall or other physical devices. In addition, wireless technology allows a network to add new devices without requiring the expansion of the underlying infrastructure. Contrary to wire-based networks, where adding a new connection location would require new wiring, hubs, routers, wall sockets, etc., adding a new network node to a wireless network typically does not require adding further equipment. Because of these benefits, a variety of applications are implementing wireless technology.

For example, a home appliance control network is one application in which the lack of added wiring infrastructure or positioning restrictions can be appreciated. A homeowner may implement a network without requiring any wiring by simply connecting appliances through wireless interfaces. The appliances in such a network may transmit information to each other and/or to a control center (e.g., a personal computer), and receive control instructions. A user is thus able to control a variety of home appliances individually or in coordination in order to provide desired functionality. A user may, for instance, control an air conditioning system in coordination with the opening and closing of the windows to provide climate control while saving energy.

However, most home owners are not network specialists. The set-up of the network and the individual configuration of each wireless device or node can therefore be a source of great frustration to the homeowner. Further, such networks may also suffer from less than optimal performance, due to the homeowner's reliance on poorly tuned manufacturer default settings that fail to anticipate all network conditions.

Current wireless networks are typically built around a main point of contact, also known as an access point, and a number of wireless devices. The access point acts as a hub that wirelessly connects other devices and manages network traffic. In order to expand a network to an area larger than a single access point, additional access points may be added and configured to communicate with other neighboring access points and other wireless devices. To setup such network, a user typically has to configure the access point and all other wireless devices. The configuration may require selecting a given transmission frequency (or channel) and other communication parameters. Existing wireless communication protocols may allow access points to automatically discover other nodes in the vicinity and establish communication connections. In the latter case, the user is still required to provide basic configuration for each device.

Although, the existing technologies may use protocols that enable access points to automatically discover wireless devices, significant user assistance is still required to complete the configuration. The system complexity and amount of user intervention increases further when the chosen application requires the network to cover areas larger than the range of a single access point. As mentioned above wireless networking is implemented in a wide variety of applications, the users of which may not possess the technical savvy to perform complex configuration steps. Therefore, there is a need for a system that enables networked wireless devices to discover and configure each other in a manner that provides optimal performance and requires less user intervention.

SUMMARY OF THE INVENTION

The invention provides a method and apparatus for wireless network nodes to scan for neighboring nodes in order to collect and configure network parameters. Embodiments of the invention allow a super node to scan the network by broadcasting network packets that contain scanning information. The scanning information may contain channel information and a schedule for switching to a different channel. A network node that receives the broadcast packets utilizes the information contained in the packets to start switching channels on the specified schedule.

In one or more embodiments of the invention, a node that receives a broadcast packet replies to the broadcast by transmitting its own packets. For example, the receiving node transmits information to identify itself. The first node (or the super node) receives the reply, which indicates that the receiving node is able to communicate on a specific channel.

The super node typically repeats the cycle of broadcasting then switching to a different channel in order to cover an entire set of available channels. After one or more sweeps of a set of channels, the super node becomes aware of all of the available channels for each node that can be reached directly.

Network nodes within the range of a super node are first-level nodes (or sub-nodes). While the first-level nodes are broadcasting their own discovery packets, they may reach other nodes that may not be within reach of the super node. The latter nodes are second-level nodes. In one or more embodiments, second-level nodes are also capable of switching channels to follow a sweep session, and reply to broadcasts in order to identify themselves on a network.

In embodiments of the invention, first-level nodes are capable of receiving broadcast information from second-level nodes and relaying such information to a super node. The super node is further capable of recording the presence of network nodes that may be reached through a proxy, and the channel availability for each of those nodes.

In one or more embodiments of the invention, the super node is capable of instructing each node on a network to work with a set of network configuration parameters. The super node may utilize the information gathered during the scanning session to determine a set of configuration parameters for each one of the nodes on the network, and to transmit the set of configuration parameters to the corresponding node. The configuration parameters may comprise information for one or more channels that the node should use to communicate with one or more other nodes.

Alternatively, any network node implementing the invention may determine its own (optimal) configuration parameters and transmit its configuration information to other nodes on the network.

DETAILED DESCRIPTION

Figure 1:
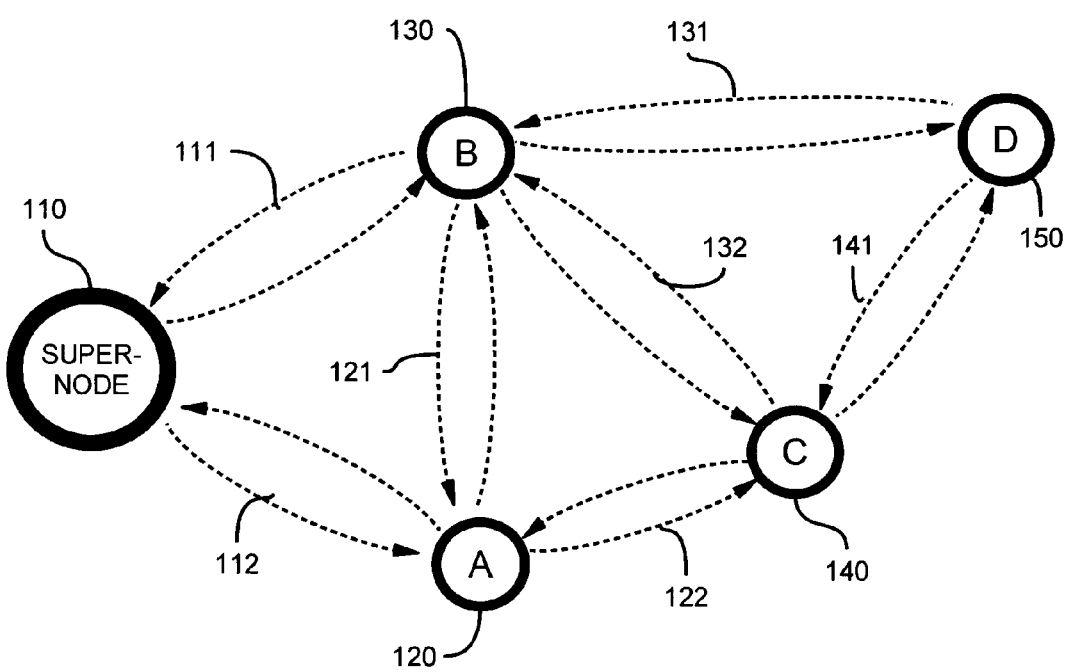
FIG. 1 is a block diagram representing a typical layout of wireless devices in which an embodiment of the invention may be utilized to allow the devices to discover each other and setup communication channels.

A method and apparatus for discovering wireless devices and performing channel selection are described. In the following description, numerous specific details are set forth to provide a more thorough description of the invention. It will be apparent, however, to one skilled in the art, that the invention may be practiced without these specific details. In other instances, well known features have not been described in detail so as not to obscure the invention.

Terminology

The invention described herein is set forth in terms of methods and systems implementing those methods. It will be apparent, however, to one with ordinary skill in the art that the invention may be implemented as computer software, i.e., computer program code capable of being transmitted over a communication medium (wired or wireless), stored in storage media, read by a digital computer and/or executed on a microprocessor; or as hardware, e.g., integrated circuits; or a combination of such capable of implementing the invention. References to a network node may refer to any computing device (e.g., a desktop or a laptop computer, a portable digital assistant (PDA), a cellular phone, an appliance controller, or any other electronic device) that is enabled with wireless communication capabilities.

Further, embodiments of the invention may incorporate the interconnection of wired devices with one or more wireless nodes. However, such wired communications are not the focus of the invention, and thus will not be explicitly discussed. Rather, the reader may consider that one or more wireless nodes may encompass a cluster of two or more wired devices.

In the following description, the term "user" may refer to a person using a computer application and/or to one or more processes interacting with a computer application or system. A process may be any computer program executing locally or remotely, and such processes may typically be triggered by one or more events. An event is defined as the occurrence of a low-level action such as receiving a radio signal, a high-level action such as receiving authentication information, a combination thereof or any other action capable of triggering a process.

Throughout the disclosure, examples may refer to a distribution of nodes on a network. The examples may also refer to a distance between any two nodes when discussing accessibility in terms of communications. However, an obstacle blocking radio waves between two (2) nodes may give a similar signal attenuation effect to that of a large distance between those nodes. Embodiments of the invention may be used to enhance the accessibility of wireless nodes in either situation.

The examples that follow may refer to the number of "hops" between a source node and a destination node, that is, the number of relays a packet traverses to reach the destination node from the source node.

In the following description, references to the relay of information may refer to the fact that a given node repeats a message, or re-transmits a message after it has interpreted its content. For example, if a given node "X" transmits a message that instructs a receiving node to reply to the source (to node "X"), a relay node "Y" may transmit the message after the instruction has been changed to instruct a receiving node to reply to node "Y", allowing node Y to relay a potential reply message back to the source, i.e., node "X".

Overview of the Invention

The invention provides a method for enabling wireless devices to discover each other directly within a reachable range, and to discover more inaccessible nodes that can be reached by proxy. Furthermore, the invention provides a method by which a primary node, or "super node", may construct a map of available nodes and their respective available channels. An embodiment of the invention allows a user to set up a network of wireless devices without requiring the user to manually determine a communication channel for each of the devices. Embodiments of the invention utilize a mesh topology of the devices to "sweep" the network, gathering information about each network node, including those nodes that are multiple hops from the primary node carrying out the scanning.

In one or more embodiments of the invention, undiscovered nodes may reside on any channel (i.e., be communicating or listening on any given channel). Following a scan session, the nodes may obtain a configuration to use a specific channel to communicate with one or more nodes. The discovery process can be repeated on any schedule or triggered by any programmed event. Such an event may occur, for example, when network conditions change, such as when new devices are added or environmental conditions have changed, or when a user or control process initiates rediscovery for any reason. Embodiments of the invention may be configured to detect such changes in network conditions and adapt a network configuration to those changes. Unlike existing technology, embodiments of the invention do not require manual configuration of each network node (e.g., to a preset channel), which would be problematic for a network of a hundred nodes in a residence, for example.

FIG. 1 is a block diagram representing an example layout of wireless devices in which an embodiment of the invention may be implemented to allow the devices to discover each other and set up communication channels. The example of FIG. 1 represents a single super node 110 and multiple other network nodes (e.g., blocks 120, 130, 140, and 150).

The following description uses the example of FIG. 1 to illustrate the methods that underlie the discovery process in embodiments of the invention. However, as will be obvious to one of ordinary skill in the art, the invention may be implemented in a variety of different configurations. For example, some embodiments of the invention may forego the use of a super node or they may use multiple super nodes that may further possess a hierarchical structure so as to allow one or more of the super nodes to determine the behavior of other super nodes in a hierarchical manner.

In FIG. 1, super node 110 is capable of connecting directly (e.g., through a wireless communication medium represented by 111 and 112) to node A (120) and node B (130), to further gain access to node C (140) and node D (150). This configuration may be referred to as a mesh topology.

One or more embodiments of the invention implement a protocol in which a node, such as super node 110, may communicate with the accessible nodes (e.g., node A 120 and B 130) by broadcasting a message. The message may comprise, for example, information about the channel scanning schedule and instructions to other nodes on how to communicate with the super node. For example, the super node may instruct any accessible nodes to tune to a specific channel at a specific time (actual or relative time) in order to receive the next broadcast message.

After sweeping a channel set one or more times, the super node becomes aware of all nodes within its (direct) range, because all directly accessible nodes will have received a message and tuned to a specific channel, on schedule, as directed by the super node. Further sweeping may also be performed to provide the complete channel availability for each directly accessible node.

Sweeping a set of channels is typically carried out by broadcasting a message on each of the possible channels in a timed sequence. Once a node has responded to a broadcast, the super node may record the presence of the responding node and the channel it used to respond. The super node may then instruct the node to use a given channel for subsequent communications.

In one or more embodiments, the individual nodes may be designed to cycle through the available channels on startup, at a relatively slow pace compared to the scanning of the super node. This ensures that the node device does not start and remain in an inaccessible channel, and thus avoid detection. Rather, over multiple channel sweeps by the super node, the super node and the slowly cycling node device will converge on a detectable channel, assuming one exists.

In the example of FIG. 1, node A (120) and node B (130) are physically capable of communicating directly with node C (140) and node D (150) through wireless communication media 122 and 131, respectively. In addition, FIG. 1 shows that node A (120) and node B (130) are within reach of each other and able to communicate through communication medium 122; node B (130) can reach node C (140) and node D (150) through communication media 132 and 131, respectively. Node C (140) and node D (150) are also able to communicate through communication medium 141.

In the following description, "first-level" nodes are those nodes that are directly accessible by a given first (or master) node (e.g., super node 110); "second-level" nodes are those nodes accessible through a single proxy node, the proxy node being a node that relays a message from one node to another; "third-level" nodes are accessible using a chain of two (2) proxy nodes; and so on. Typically, an embodiment of the invention will implement a maximum level for the discovery process, e.g., as a default number and/or a user-configurable value in the super node.

Embodiments of the invention may be implemented to carry out communication between any given two nodes using any number of proxy nodes. In the examples herein, the vantage point is the super node, hence node "A" and node "B" are first-level nodes; node "C" is a second-level node and node "D" may be regarded as second-level or third-level node, depending on whether it is reached through node "B" or using the chain of nodes "A" and "C", respectively.

Figure 2:
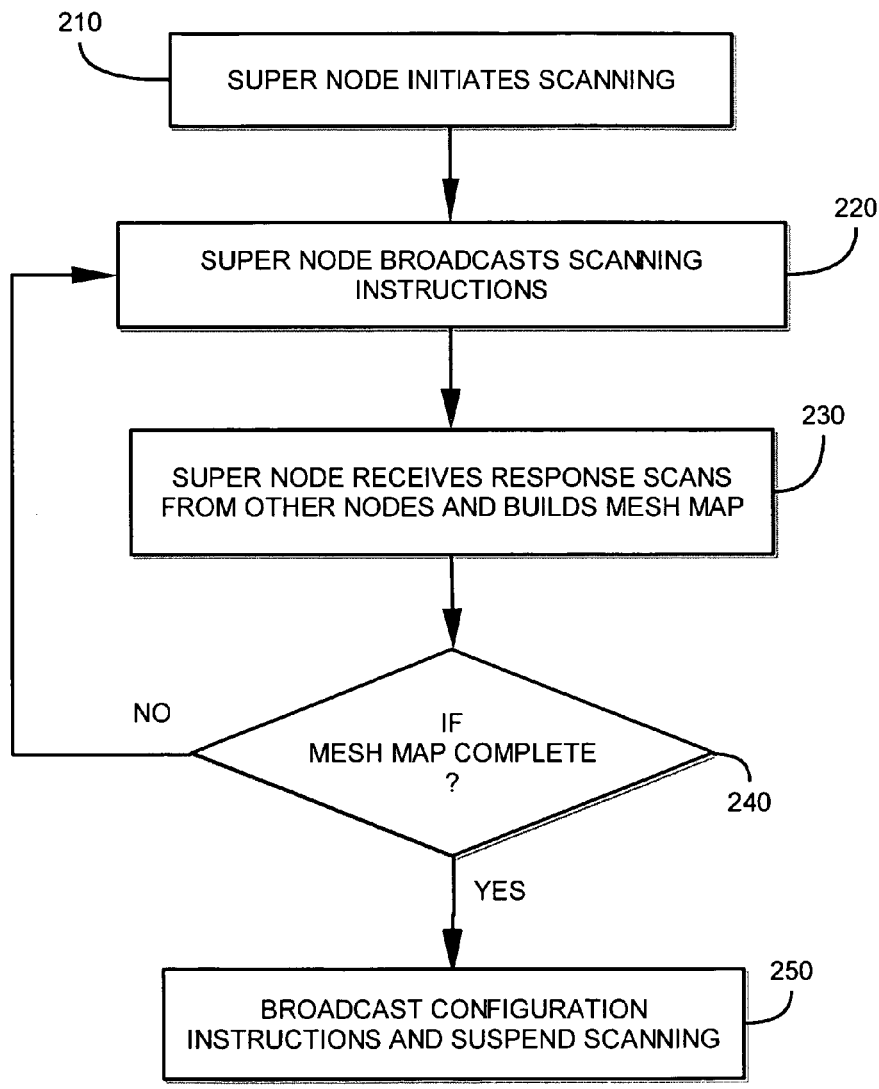
FIG. 2 is a flow diagram illustrating a device discovery and configuration process in accordance with one or more embodiments of the invention.

FIG. 2 is a flow diagram illustrating a method for the discovery and configuration of wireless nodes in accordance with an embodiment of the invention. At step 210, a first node, such as super node 110 of FIG. 1, initiates a scan session. Initiating a scan session may typically involve retrieving configuration information (e.g., input by a user), gathering stored information (e.g., in a running network to carry out an update scanning session), and determining the initial parameters for a broadcast. For example, a super node may select the channel used to initiate a scan, which may be determined based on one or more optimization parameters or a system default channel. An initial communication channel may be selected based on the last channel in use, for instance. However, if a previous connection was lost while using a given channel, a system may purposefully avoid using that specific channel when starting a new scan.

At step 220, a system implementing the invention broadcasts a message, e.g., as one or more packets of information. The packets may contain node-specific data such as the identity of the node broadcasting the message, and one or more instructions for a receiving node to execute specific method steps. For example, a super node may broadcast packets that inform the receiving node(s) of subsequent broadcasts. The super node may broadcast information about the channel on which, and the delay after which, the super node is to broadcast subsequent messages.

A receiving node implementing the invention analyzes the instructions contained in the broadcast packets from the super node and executes the proper actions. A receiving node may identify the super node and may acknowledge that a given super node is involved in a specific network. If the receiving node determines that it can or should respond to the broadcast, then it prepares communication packets. The receiving node may comply with the instructions contained in the broadcast packets originating from the super nodes. For example, a receiving node may switch to a channel and broadcast on that channel as indicated by the information contained in the super node's broadcast packets. When a node is following a super node's instructions to respond using a given channel and to switch channels on a pre-determined schedule, the node is said to be in lockstep (or sweeping) mode.

In embodiments of the invention, any node may receive broadcast information from accessible nodes. A node implementing the invention may keep a record of the identities of the nodes in its vicinity from which it has received broadcasts, as well as nodes that have responded to its broadcast.

At step 230, the super node receives reply packets from nodes within its direct range. Referring to the illustration of FIG. 1, a super node 110 may receive packets from nodes A and B. The packets received from the latter nodes may contain information about other nodes (e.g., 140 and 150), which node "A" and node "B" are able to reach.

The reply packets (packets that originate from nodes that received the initial broadcast packets from the super node) may contain any type of information that may enable the super node to build a map of the network configuration. The super node utilizes the reply information to map out all of the nodes that have been reached both directly and indirectly. For example, after successfully instructing the proximal nodes to communicate on one or more channels, the super node may record which channels are available for communication with each of the proximal nodes.

The reply information may also contain information about distal nodes. For example, a first-level node that has replied to the super node broadcast may include information about all of the other nodes with which the first-level node can communicate. The super node records the information about the distal nodes and the path information to reach each one of the distal nodes.

At step 240, the super node may check whether a mapping of the network mesh is complete. If the mesh mapping is not complete, the super node continues to the next cycle of broadcasting packets (e.g., at step 220), trying to discover further nodes and/or available communication channels. If the super node determines that the mesh map is complete, it may continue, at step 250, to send specific configuration information to each node.

Determining the completion of a network scan may be accomplished in one or more of several approaches. For example, in one embodiment, the super node may record the mesh map obtained at each sweep. By comparing mesh maps between consecutive sweeps, the super node may then determine whether all discoverable nodes have been reached, e.g., when the super node finds no significant map changes in two or more consecutive sweeps. The super node may be configured to stop scanning when a predetermined number (preferably user-configurable) of nodes on a network has been discovered, when only one available channel is found to communicate with any single discovered node, when a maximum number of hops has been reached, or any other stop condition a user or a developer of an embodiment of the invention may choose to implement. The invention allows for the implementation of one or more of the latter conditions for determining the topology of a network, and any other conditions for determining the completion of the mapping process.

Discovery of Proximal Nodes

Figure 3:
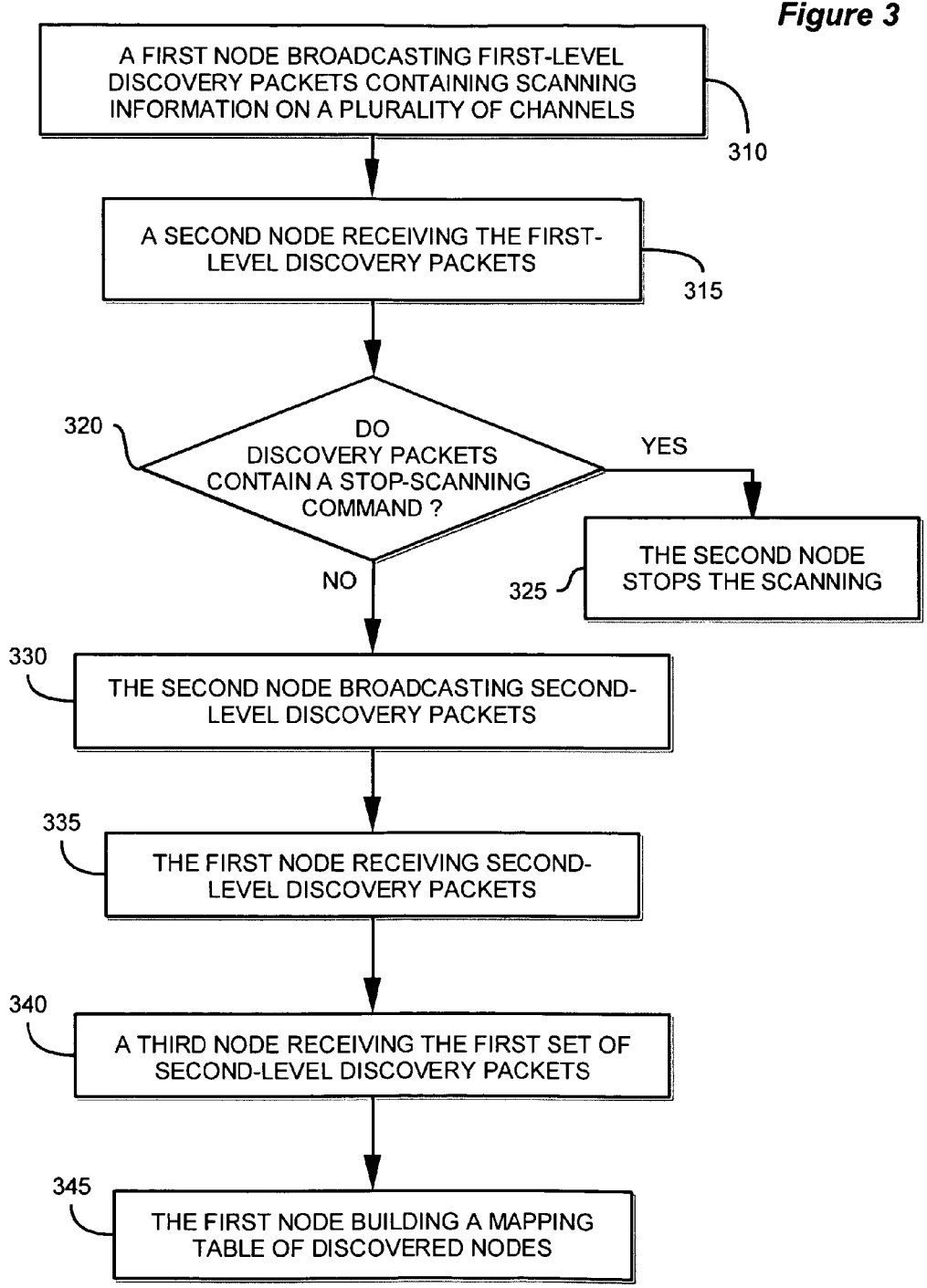
FIG. 3 is a flow diagram illustrating a discovery process for directly accessible network nodes in accordance with one or more embodiments of the invention.

FIG. 3 is a flow diagram illustrating a discovery process for directly accessible network nodes in accordance with an embodiment of the invention. At step 310, a first node, such as a super node, may broadcast a first-level discovery packet. Discovery packets may contain an identity of the node broadcasting the packets, and instructions aimed at the receiving nodes to participate in the discovery process. For example, the first node may utilize a given channel to broadcast the discovery packets and instruct the receiving nodes to switch to a specific channel on a specific schedule for a subsequent communication. Thus, after a few broadcasts, multiple nodes that may have initially been tuned in to different channels switch to the same channel on a predetermined schedule.

At step 315, a second node, such as any node within the super node's range, receives the discovery packets. The second node may receive and analyze the packets if the second node happens to be listening on the specific channel that the super node used to broadcast its discovery packets. Otherwise, the second node may remain unaware of the broadcast. In the case where the super node has completed a scan cycle, the super node may include instructions to stop the discovery process. At step 320, the second node, which has successfully received broadcast packets from the super node, checks for instructions in the packets. An instruction may take any form including the absence of a direct command. For example, if an implementation of the invention utilizes a specific command to continue the discovery process, the absence of that instruction in a discovery packet may be interpreted to mean that the discover process is suspended. If the second node determines that the discovery process is to stop, it continues to step 325. At step 325, the second node may take other actions, such as configuring itself to run on a specific channel, broadcast a message to neighboring nodes to allow them to be aware of its configuration, and/or make any communications that may result in proper (or optimized) functioning of the network.

When the second node does not receive an indication to stop the discovery process, it broadcasts a first set of second-level discovery packets, at step 330. Second-level discovery packets may be defined as discovery request packets originating from a second node. A first set of second-level packets may contain information that identifies the second node, information about the current configuration and any other type of information that may allow the second node to discover network nodes. The first set of second-level packets may also contain information about other nodes with which the second node is currently in contact.

The second-level discovery packets may also echo the instructions obtained from the first set of first-level discovery packets. Echoing may be defined as including the channel switching and schedule obtained from those in the first-level packets. The latter is a significant enhancement over the existing protocols, since it allows the super node to subsequently discover nodes that are out of its direct reach.

The second node may also be enabled to schedule it own discovery process. For example, the second node may offset the channel sequence in order to preempt the discovery sequence from the first node, thus, saving time or the need for extra-sweeps in order to complete the discovery process. In other instances the second node may utilize a time step significantly smaller than the one scheduled by the first node, or may utilize a time offset of the schedule with sub-nodes, in order to collect as much information about the sub-nodes within its reach before the next cycle (or broadcast) of discovery packets from the first node.

At step 335, the first node receives the first set of second-level discovery reply packets from the second node. At this step a super node, for example, receives the information about the nodes that have received a broadcast (on a specific channel) within its range, which also indicates that those nodes have properly executed the instructions.

At step 340, a third node may receive a first set of second-level discovery packets. If a third node is tuned to a channel used to broadcast the first set of second-level discovery packets, the third node responds by transmitting its own discovery packets that may contain an identifier of itself and other information such as its network configuration information. Similarly to second-level discovery/reply packets, the discovery/reply packets originating from the third node may echo the instructions obtained from the first (and/or second) node to switch channels on a given schedule.

The steps in FIG. 3 may be repeated, using a different channel for each iteration, and thus sweeping the set of channels. For example, in an embodiment of the invention using sixteen (16) channels (e.g., numbered channel 0 through 15), the system may conduct a sweep by iteratively scanning the network using channel 0, then channel 1, then channel 2 through channel 15.

At step 345, the super node collects the information about the nodes that have been discovered and builds a map. The map may include information that may be subsequently utilized to configure a network. The map may, for instance, collect an identification of each accessible node, and associate it with information about available communication channels. For example, referring to FIG. 1, the super node can communicate directly with sub nodes "A" and "B", but only with help of a mesh be able to communicate with nodes "C" and "D". The channels are numbered zero (0) to five (5) in this simplified example, with node "A" being initially on channel four (4), node "B" on channel five (5), node "C" on channel two (2) and node "D" on channel three (3). At the end of the first sweep, the super node has returned to channel 0, while nodes "A" and "B" have followed the super node and stepped themselves to channel 0. The Super node has recorded the channels on which it has received information from each node. Because the nodes step through each channel in sequence together, a blocked channel is noted, but may not stop the sweep.

As an example, Table 1 represents the discovery data which the super node may generate following a first sweep:

TABLE 1

| Channel | Node A (lockstep) | Node B (lockstep) | Node C (fixed) | Node D (fixed) |
|---|---|---|---|---|
| 0 | Y | Y | ? | ? |
| 1 | ? | ? | ? | ? |
| 2 | ? | ? | ? | ? |
| 3 | ? | ? | ? | ? |
| 4 | Y | Y | ? | ? |
| 5 | Y | Y | ? | ? |

Figure 4:
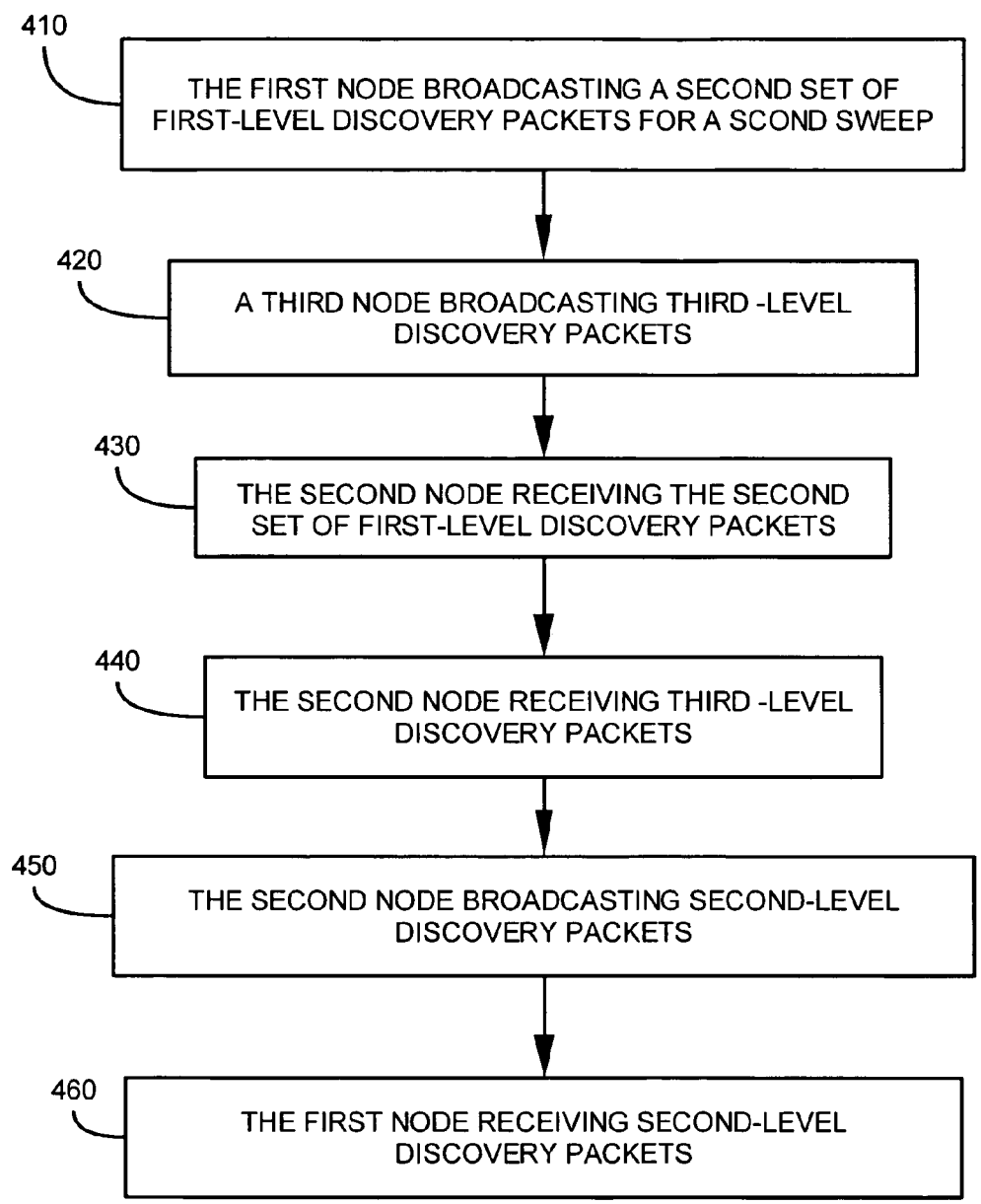
FIG. 4 is a flow diagram illustrating a proxy-based discovery process in accordance with one or more embodiments of the invention.

Table 1 shows that, following the first sweep, the super node has determined that nodes "A" and "B" exist and can communicate on channels 0, 4, and 5. Their behavior on channels 1, 2, and 3 remained undetermined (symbolized with a question mark "?") potentially until a second sweep has been performed. The super node then begins a second sweep. Nodes "A" and "B" are in lockstep, changing channels on the same frequency and rebroadcasting the discovery packets to attempt to reach nodes out of the super node's range Discovery of Distal Nodes FIG. 4 is a flow diagram of the subsequent stages of network discovery in accordance with an embodiment of the invention. At step 410, a first node, such as a super node, may broadcast a second set of first-level discovery packets. The second set of first-level discovery packets may be identical to the initial set of discovery packets used in the first sweep.

At step 420, a third node which may have received second-level packets may transmit its discovery reply packets. The third node having received second-level packets may already be in lockstep with a second node, although, the channel switching cycle may be one channel behind. At step 430, the second node may receive the third node's discovery reply packets. At step 450, the second node transmits a second set of second-level discovery reply packets. The second set of second-level discovery reply packets may contain information about third nodes.

At step 460, the first node receives the second set of discovery reply packets from the second node. Following this step, the first node collects information about distant nodes that may be reached through the second node.

Referring to the example of FIG. 1, the super node begins a second sweep. Nodes "A" and "B" are in lockstep, changing channels on the same frequency and rebroadcasting the discovery packets in an attempt to reach nodes too far for the super node to reach directly. At the latter stage, nodes "A" and "B" are in lockstep, and nodes "C" and "D" are, for example, on channels 2 and 3, respectively. After the second sweep, devices "C" and "D" have been discovered and are now also sweeping in lock step. It also has been determined that node "A" is not available on channel 2, for example. Nodes "C" and "D" are also unavailable on channels 4 and 5.

Table 2 shows the state of the discovery process at the end of the second sweep. The availability of nodes "C" and "D" on channels 0, 1, and 2, may not be determined until another sweep has been performed.

TABLE 2

| Channel | Node A | Node B | Node C | Node D |
|---|---|---|---|---|
| 0 | Y | Y | ? | ? |
| 1 | Y | Y | ? | ? |
| 2 | N | Y | Y | ? |
| 3 | Y | Y | Y | Y |
| 4 | Y | Y | N | N |
| 5 | Y | Y | N | N |

Tables 2 shows that node "A" is available for communication on channels 0, 1, 3 and 5 and unavailable on channel 2, node "B" available for communication on all channels (0 though 5), node "C" is available on channels 2 and 3 and unavailable on channels 4 and 5, and node "D" available on channel 3 and unavailable on channels 4 and 5. Channel availability is undetermined, at this stage, for nodes "C" and "D" on channels 0 and 1 for node "C" and channels 0, 1 and 2 for node "D".

The discovery of network device as described in FIGS. 2, 3 and 4 may be generalized to continue repeating the steps detailed above in order to discover any network device available for communication and obtain information about its channel availability. For example, following two sweeps of the network, in the above example, the information map (e.g., Table 2) shows for each node whether a channel has been determined available, unavailable or not yet determined. As mentioned above, an embodiment of the invention may decide to stop the discovery process following a stop condition, as described above.

Referring to the example of FIG. 1, the super node may begin a third sweep, with all of the devices in lock step. In this example, it may sweep one more time to discover whether nodes "C" and "D" are able to communicate on channels 0, 1, and 2, as well as discover if there are any other devices beyond nodes "C" and "D".

Table 3 shows the state of the network following the third sweep.

TABLE 3

| Channel | Node A | Node B | Node C | Node D |
|---|---|---|---|---|
| 0 | Y | Y | N | N |
| 1 | Y | Y | N | Y |
| 2 | N | Y | Y | N |
| 3 | Y | Y | Y | Y |
| 4 | Y | Y | N | N |
| 5 | Y | Y | N | N |

Nodes "C" and "D" have been determined to be unavailable on channels, 1, 4, and 5, and no other devices have been discovered. The super node may continue the sweep several more times in order to confirm the discovery table. The maximum number of sweeps needed (in theory) would equal to the number of nodes in the mesh plus one. However, as previously stated, embodiments of the invention may be configured to suspend scanning after satisfaction of a pre-set (e.g., user-configurable and/or default) condition (e.g., a maximum scan time, a maximum number of devices, a maximum number of mesh levels, etc.).

Once the super node has the information shown in Table 3, the super node can determine the channel that is optimum for establishing the mesh network. All of the nodes would then be instructed to use the optimum channel. In the above example, all of the nodes are accessible on channel 3, suggesting that, for that mesh, channel 3 is optimum.

In addition to learning the channels available for communicating with each node, the discovery scan may also result in the super node discovering the type of each node (e.g., the services provided by each node) and the identity of those nodes that may serve as proxies. This information may also be used to form the criteria for determining the optimum channel, as well as the nodes that will be used as relay proxies in the resulting network. For example, the optimum channel may be the channel that provides for one or more of: the largest number of supported nodes; the inclusion of certain types of nodes, the least number of hops for a mesh where multiple proxy paths are available, etc.

Generalization of the Discovery Protocol

Figure 5:
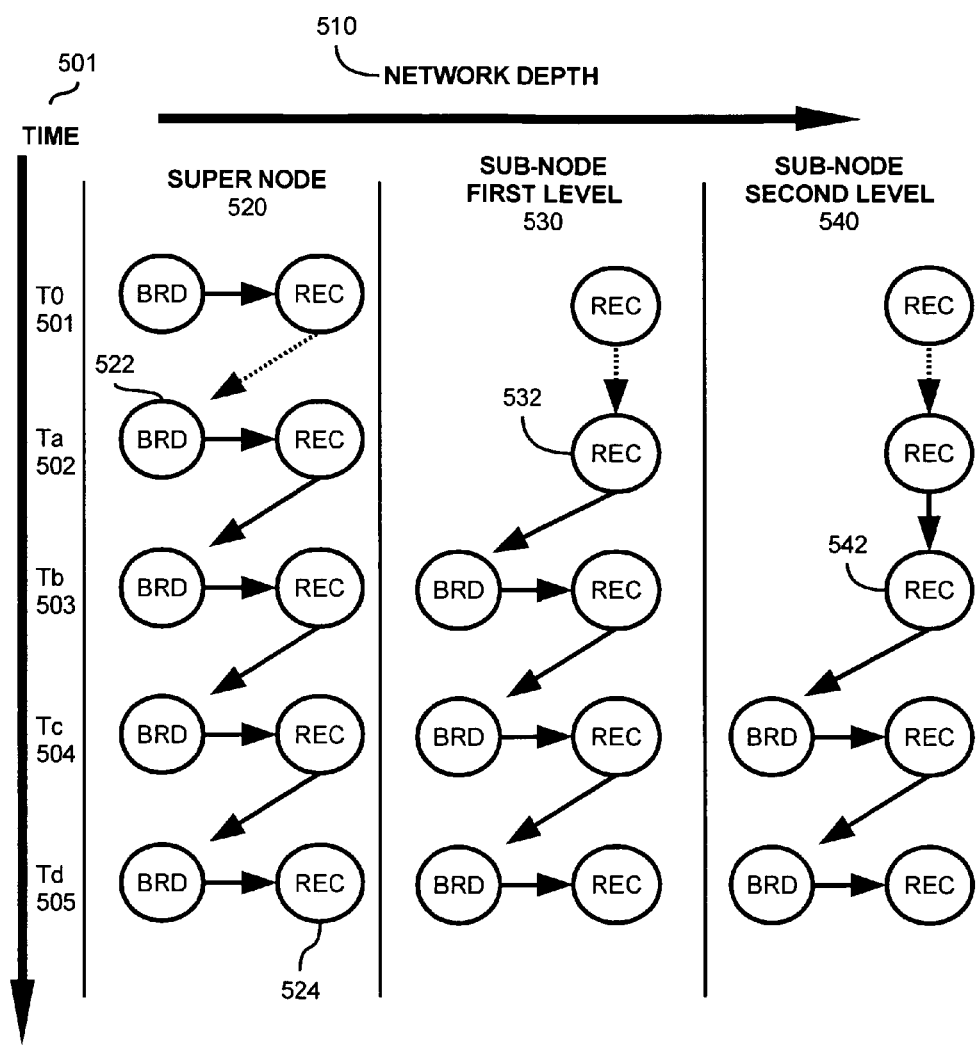
FIG. 5 is a block diagram illustrating an example of the state changes of network nodes during a discovery process in accordance with one or more embodiments of the invention.

FIG. 5 is a block diagram representing state changes of representative network nodes during a discovery process in accordance with an embodiment of the invention. The network may be configured to recruit network nodes to any depth of network, represented by the depth arrow 510. The network depth may be defined as the number of nodes that can be reached through intermediaries (or proxy nodes) from an initial node, such as a super node 520. FIG. 5 shows two (2) levels, sub-node first level 530 and sub-node second level 540. The sub-node first level 530 represents the set of nodes that can be reached from the initial node 520, whereas sub-node 540 represents the nodes that can reached from the first-level sub-nodes.

FIG. 5 shows a time arrow 501 indicating the direction of evolution of states of network nodes. For simplicity, a network node is considered to be in broadcasting discovery packets mode (e.g., 522) or in receiving. Generally, a node may be viewed as being in receiving mode, since when it is normally communicating with other nodes on a network or when it is first powered on and ready for discovery, it is typically set to listen to broadcasts from neighboring nodes. When involved in a scanning session or when first powered on, in accordance with one or more embodiments of the invention, a node also starts broadcasting discovery packets.

In one or more embodiments of the invention, a scanning session may start on a predetermined schedule, on a randomly chosen schedule, or following a pre-determined event. The start of a scanning session is indicated by T0 (e.g., at time 201) in FIG. 5. A super node starts broadcasting discovery packets that contain channel switching information. The latter typically indicate to any reachable network node (e.g., node 530) a channel and a time for switching to a different channel. The super node then switches to the announced channel following the announced time delay. The super node 520 may go through each channel in any sequence, with the chosen sequence broadcast to the respective sub-nodes ahead of each change so that lock step performance may be achieved.

When the super node reaches a specific channel, such as at time Ta 202, a sub-node in state 532 may receive broadcast packets from the super node. Following, the super node's information, sub-node 530 may switch to the channel announced by the super node at time Tb 503. From time Tb and later, both the super node 520 and the first-level sub-node 530 are in sweeping mode, meaning that they both broadcast discovery packets and receive packets on a channel that is determined by the scanning session.

At time Tb, the broadcast from node 530 informs the super node of the existence of the sub-node 530. The broadcast from a first-level sub-node may also be received by a second-level sub-node 540 that is receiving (e.g., state 542) on the selected given channel. The latter sub-node may then switch in concert with the other nodes to the next scheduled channel at time Tc 504. The first-level sub-node receives the information from second-level sub-nodes and transmits that information back to the super node, for example, at time Td 505.

At time Tc 504, when the second-level starts broadcasting discovery packets, or at any other time when the proper channel is in use, a third-level sub-node (not shown in the figure) may be recruited in the same manner the first-level and the second-level sub-nodes were recruited.

The concept of spreading discovery packet information to reach distant network nodes may be generalized to any level of depth of a network by utilizing proxy broadcasting and reporting of the discovered nodes to upper levels of a chain of discovery.

Embodiments of the invention may automatically discover network nodes, including those not directly accessible to the super node, during an initial network scan. Embodiments of the invention may also update an existing network following, for instance, a change of the environmental conditions.

Thus a method and apparatus for device discovery and channel selection in a wireless networking environment have been described. Particular embodiments described herein are illustrative only and should not limit the present invention thereby. The invention is defined by the claims and their full scope of equivalents.

What is claimed is:

1. A wireless network device comprising:
 a wireless communications capability, said wireless communications capability configured to operate in a discovery mode; said discovery mode comprising broadcasting a discovery message sequentially over a set of communications channels, said discovery message comprising instructions for communicating on a first channel of said set of communications channels as of a first time; said discovery mode further comprising receiving direct reply messages to said discovery message from directly communicating wireless devices; and
 a network mapping capability, said network mapping capability configured to construct a network map comprising said directly communicating wireless devices using information from said direct reply messages.

2. The wireless network device of claim 1 wherein said discovery message comprises identification information for said wireless network device.

3. The wireless network device of claim 1 wherein said discovery mode further comprises receiving indirect reply messages from indirectly communicating wireless devices via at least one of said directly communicating wireless devices.

4. The wireless network device of claim 3 wherein said mapping capability is configured to construct a network map comprising said directly and indirectly communicating wireless devices based on information in said direct and indirect reply messages.

5. A wireless network device comprising:
 a wireless communications capability, said wireless communications capability configured to operate in a response mode; said response mode comprising receiving a first discovery message comprising instructions for communicating on a first channel of a set of communications channels as of a first time, wherein said first discovery message further comprises information about a channel scanning schedule and instructions on how to communicate with a node that sent the first discovery message; said response mode further comprising transmitting a first reply message to said first discovery message over said first channel after said first time.

6. The wireless network device of claim 5 wherein said wireless communications capability is further configured to operate in a discovery mode, said discovery mode comprising broadcasting a second discovery message sequentially over said set of communications channels, said discovery message comprising instructions for communicating on a second channel of said set of communications channels as of a second time; said discovery mode further comprising receiving direct reply messages to said second discovery message from directly communicating wireless devices.

7. The wireless network device of claim 6 wherein said discovery mode further comprises broadcasting a second reply message comprising information from one or more of said direct reply messages over said first channel after said first time.

* * * * *